United States Patent
Hill et al.

(10) Patent No.: US 7,177,657 B2
(45) Date of Patent: Feb. 13, 2007

(54) METHOD AND APPARATUS IN A WIRELESS COMMUNICATION SYSTEM FOR IDENTIFYING WHO HAS RECEIVED A GROUP MESSAGE

(75) Inventors: Thomas Casey Hill, Crystal Lake, IL (US); Michael Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 995 days.

(21) Appl. No.: 10/158,998

(22) Filed: May 30, 2002

(65) Prior Publication Data

US 2003/0223449 A1 Dec. 4, 2003

(51) Int. Cl.
*H04Q 7/20* (2006.01)
(52) U.S. Cl. .................. 455/518; 455/519; 455/521
(58) Field of Classification Search ............. 455/519, 455/518; 370/310, 433; 340/7.27, 10.32
See application file for complete search history.

(56) References Cited

U.S. PATENT DOCUMENTS

| | | | |
|---|---|---|---|
| 5,128,938 A | 7/1992 | Borras | |
| 5,600,312 A * | 2/1997 | Willard et al. | 340/7.27 |
| 6,377,793 B1 | 4/2002 | Jenkins | |
| 6,466,552 B1 * | 10/2002 | Haumont | 370/310 |
| 6,829,487 B2 * | 12/2004 | Eiden et al. | 455/519 |
| 6,882,856 B1 * | 4/2005 | Alterman et al. | 455/519 |
| 6,912,402 B1 * | 6/2005 | Haumont et al. | 455/519 |
| 7,027,800 B2 * | 4/2006 | Haumont et al. | 705/14 |

* cited by examiner

*Primary Examiner*—John Pezzlo
*Assistant Examiner*—Albert T. Chou
(74) *Attorney, Agent, or Firm*—Charles W. Bethards

(57) ABSTRACT

A server (102) receives (302) from an originator a group message directed to an address associated in the server with a pre-defined plurality of recipients whose coupling to the wireless communication system at any given time is either active or inactive. The server stores (304) the group message, and transmits (316) the group message to each recipient of the pre-defined plurality of recipients whenever the recipient is actively coupled to the wireless communication system. The server indicates (318) thereafter to the originator that the recipient has received the group message.

17 Claims, 2 Drawing Sheets

METHOD AND APPARATUS IN A WIRELESS COMMUNICATION SYSTEM FOR IDENTIFYING WHO HAS RECEIVED A GROUP MESSAGE

FIELD OF THE INVENTION

This invention relates in general to wireless communication systems, and more specifically to a method and apparatus for a server in a wireless communication system to identify who has received a group message.

BACKGROUND OF THE INVENTION

The convergence of Internet and wireless telephony through packet-based systems has led to new opportunities as well as new problems. One new opportunity that has emerged is the utilization of an instant messaging-type server in combination with a wireless communication system to provide a group messaging service. A problem that arises in such a service is that users of instant messaging systems can be actively coupled (logged on) to the system or inactively coupled (logged off) at any given time. Thus, a message originator who sends a group message to a plurality of wireless recipients does not have any way of knowing who has received the group message and who has not.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

A method and apparatus is needed for a server in a wireless communication system to identify who has received a group message. The method and apparatus preferably will inform the message originator as to which recipients are logged on at the time of message receipt, as well as when each recipient receives the group message. The method and apparatus further preferably will inform the originator when all recipients have received the group message.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

Figure 1:
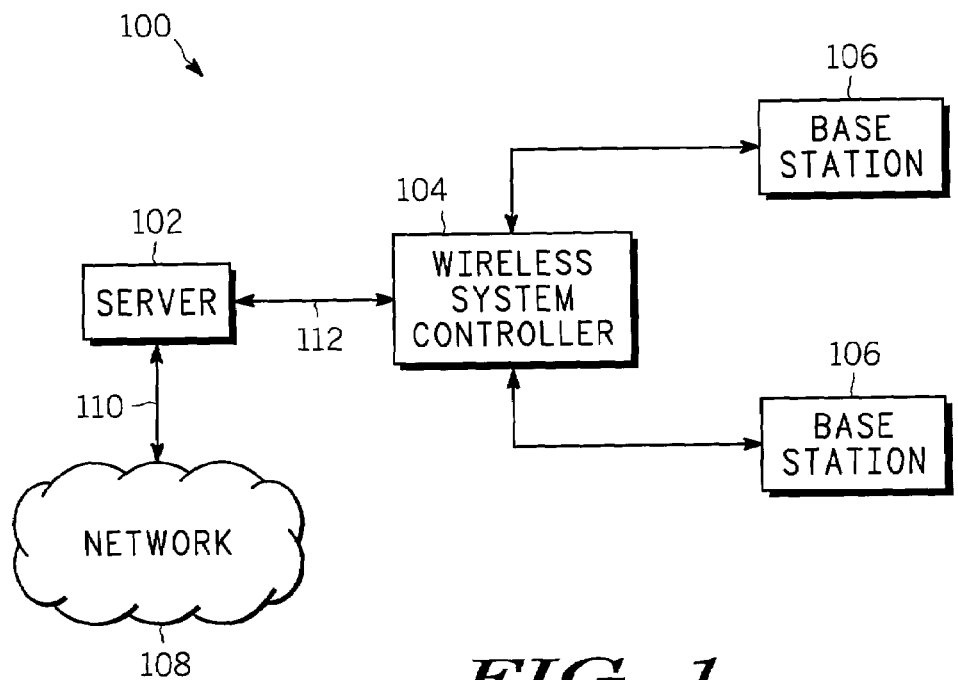
FIG. 1 is a high-level exemplary electrical block diagram of server coupled to a wireless communication system in accordance with the present invention.

Referring to FIG. 1, a high-level exemplary electrical block diagram 100 depicts a server 102 coupled to a wireless communication system in accordance with the present invention. The server 102 is for receiving, from an originator, a group message directed to an address associated in the server 102 with a pre-defined plurality of recipients whose coupling to the wireless communication system at any given time is one of active and inactive. The wireless communication system comprises a conventional wireless system controller 104 coupled to the server 102 through a first conventional communication link 112 for communicating with the server 102. The server 102 is also coupled to a network 108 (e.g., the Internet, the public switched telephone network, or a local area network, or LAN), through a second conventional communication link 110 for communicating therewith. The network 108 can be used, for example, for access by an alternate population of instant messaging users. The wireless communication system further includes a plurality of conventional base stations 106 coupled to the wireless system controller 104 for communicating with conventional wireless units (not shown) that are actively coupled to the system. The server 102 will need to be informed by the balance of the system of such matters as the wireless unit status (active or inactively coupled) as well as message status vis-a-vis each unit, delivery attempt, etc. This information is available and provided to the server with most conventional protocols that use wireless delivery techniques or processes and readily provided from other protocols with minimal efforts by one of ordinary skill.

Figure 2:
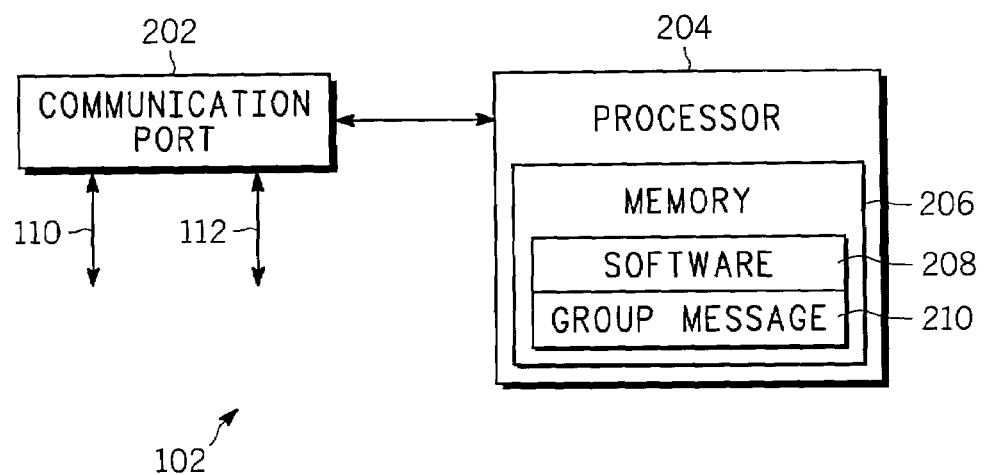
FIG. 2 is a more-detailed electrical block diagram of the server in accordance with the present invention.

Referring to FIG. 2, a more-detailed electrical block diagram of the server 102 in accordance with the present invention comprises a communication port 202 for communicating with the originator to receive the group message. The communication port 202 preferably communicates with the originator to receive the group message through the second communication link 110 when the originator is coupled via the network or PSTN 108. Alternatively, when the originator is a wireless unit, the communication port 202 preferably receives the group message through the first communication link 112 from the wireless system. The server 102 further comprises a processor 204 coupled to the communication port 202, the processor 204 comprising a memory 206, for storing the group message in a group message slot 210. The memory 206 also includes software 208 for programming the processor 204 in accordance with the present invention. The processor 204 is programmed by the software 208 to cooperate with the communication port to transmit via the first communication port 112 the group message to each recipient of the pre-defined plurality of recipients whenever the recipient is actively coupled to the wireless communication system; and to indicate thereafter to the originator that the recipient has received the group message.

In one embodiment, the processor 204 is further programmed to cooperate with the communication port 202 to identify to the originator the pre-defined plurality of recipients who are actively coupled (i.e., logged on) to the wireless communication system when the group message is received by the server 102. This preferably is accomplished through conventional protocols via the first communication link 112. In another embodiment, the processor 204 is further programmed to cooperate with the communication port 202 to inform the originator when the group message has been transmitted to all of the pre-defined plurality of recipients.

In a third embodiment, the processor 204 is further programmed to cooperate with the communication port 202 to separate the pre-defined plurality of recipients into a plurality of predetermined categories; and to inform the originator whenever the group message has been transmitted to all of the recipients in one of the plurality of predetermined categories. The predetermined categories can be, for example, (1) those recipients to whom the group message is directly addressed and (2) those recipients to whom the group message is merely copied. Another example of predetermined categories is (1) primary staff, (2) secondary staff, and (3) other interested parties. It will be appreciated that one of ordinary skill in the art will readily envision other useful predetermined categories that can be implemented. It will be further appreciated that users can program the predetermined categories through well-known telephone or Internet access techniques, as well as local set-up preferences.

In a fourth embodiment, the processor 204 is further programmed to cooperate with the communication port 202 to identify to the originator one of the pre-defined plurality of recipients who is first to receive the group message. This can be useful for providing feedback to the originator that the system is working. In a fifth embodiment, the processor 204 is further programmed, when a predetermined condition is met, to cooperate with the communication port 202 to designate a person other than the originator to receive message status notifications intended for the originator, and to send to the person designated the message status notifications intended for the originator. In one aspect of this embodiment, the predetermined condition is that the originator is no longer actively coupled to the wireless communication system, thus the system can advantageously send the message status notifications to a designated representative of the originator. In another aspect of this embodiment, the predetermined condition is selected from a group of predetermined conditions consisting of a time of day range, a message priority level, and a pre-programmed preference. For example, the originator can designate that the message status notifications be sent to an assistant during evening hours, when the message priority level is below a predetermined level, or always. It will be appreciated that users can program the predetermined conditions and associated designated person(s) to receive the notifications, through well-known techniques via access by telephone, Internet, and local programming ports.

Figure 3:
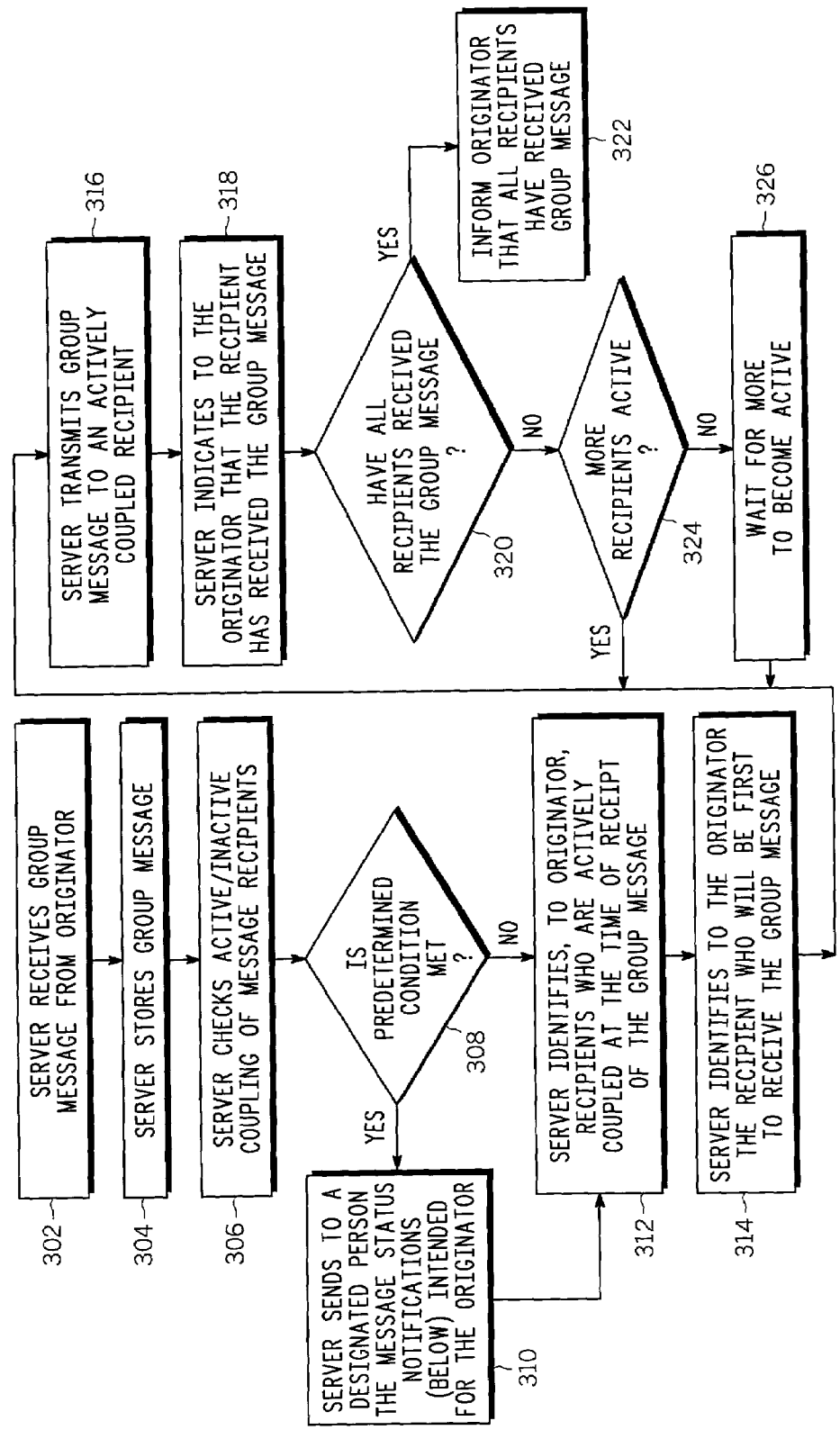
FIG. 3 is a flow diagram depicting operation of the server and wireless communication system in accordance with the present invention.

Referring to FIG. 3, a flow diagram depicting operation of the server 102 and wireless communication system in accordance with the present invention begins with the server receiving 302 a group message from an originator. The group message is directed to an address associated in the server 102 with a pre-defined plurality of recipients whose coupling to the wireless communication system at any given time is either active (logged on) or inactive (logged off). In response, the server 102 stores 304 the group message in the memory 206. The server 102 then communicates with the wireless communication system to check 306 for recipients who are actively coupled to the system. In addition, the server 102 checks 308 whether a predetermined condition for alternative message status notification is met. If so, at 310, the server will set a flag to send message status notifications (that would normally go to the originator of the group message) to a designated person instead of (or, alternatively, in addition to) to the originator. The designated person and the predetermined condition(s) preferably are programmed in advance by, or on behalf of, the originator through conventional data entry techniques.

The server 102 then identifies 312 to the originator (or, when applicable, to the designated person) the recipients who are actively coupled to the system at the time of receipt of the group message. In addition, the server identifies 314 to the originator (or, when applicable, to the designated person) the recipient who will be first to receive the group message. The server 102 then cooperates with the wireless communication system to transmit 316 the group message to an actively coupled recipient. After transmitting the message, the server 102 indicates 318 to the originator (or, when applicable, to the designated person) that the specific recipient has received the group message. The server 102 then checks 320 whether all the recipients have received the group message. If not, the server 102 then checks 324 whether there are additional active recipients who have not yet received the message. If so, the flow returns to step 316 to transmit the message to a next active recipient. If not, the server 102 waits 326 for additional recipients to become actively coupled, and then proceeds to step 316. When, on the other hand, in step 320 the server 102 determines that all recipients have received the message, the server 102 informs 322 the originator (or, when appropriate, the designated person) that all recipients have received the group message. It will be appreciated that, should the server 102 be unable to deliver the group message to a recipient within a predetermined time, the server 102 optionally can terminate the process and suggest to the originator that an alternative message delivery system may be more appropriate for communicating with the recipient.

Thus, it should be clear from the preceding disclosure that the present invention provides a method and apparatus for a server in a wireless communication system to identify who has received a group message. The method and apparatus advantageously informs the message originator as to which recipients are logged on at the time of message receipt, as well as when each recipient receives the group message. The method and apparatus further advantageously informs the originator when all recipients have received the group message.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in a server coupled to a wireless communication system for identifying who has received a group message, the method comprising the steps of:
   receiving, from an originator, the group message directed to an address associated with a pre-defined plurality of recipients whose coupling to the wireless communication system at any given time is one of active and inactive;
   storing the group message;
   identifying to the originator the pre-defined plurality of recipients who are actively coupled to the wireless communication system when the group message is received by the server;
   transmitting the group message to each recipient of the pre-defined plurality of recipients whenever the recipient is actively coupled to the wireless communication system;
   indicating thereafter to the originator that the recipient has received the group message;
   the method, further comprising, when a predetermined condition is met,
   designating a person other than the originator to receive message status notifications intended for the originator, and
   sending to the person designated, the message status notifications intended for the originator.

2. The method of claim 1, further comprising the step of informing the originator when the group message has been transmitted to all of the pre-defined plurality of recipients.

3. The method of claim 1, further comprising the steps of:
   separating the pre-defined plurality of recipients into a plurality of predetermined categories; and
   informing the originator whenever the group message has been transmitted to all of the recipients in one of the plurality of predetermined categories.

4. The method of claim 1, further comprising the step of identifying to the originator one of the pre-defined plurality of recipients who is first to receive the group message.

5. The method of claim 1, wherein the predetermined condition is that the originator is no longer actively coupled to the wireless communication system.

6. The method of claim 1, wherein the predetermined condition is selected from a group of predetermined conditions consisting of a time of day range, a message priority level, and a pre-programmed preference.

7. A server coupled to a wireless communication system for identifying who has received a group message, the server comprising:
   a communication port for receiving from an originator, the group message directed to an address associated with a pre-defined plurality of recipients whose coupling to the wireless communication system at any given time is one of active and inactive; and
   a processor coupled to the communication port, the processor comprising a memory, for storing the group message,
   wherein the processor cooperates with the communication port to:
   transmit the group message to each recipient of the pre-defined plurality of recipients whenever the recipient is actively coupled to the wireless communication system;
   indicate thereafter to the originator that the recipient has received the group message unless a predetermined condition is met; and
   when the predetermined condition is met, to cooperate with the communication port to designate a person other than the originator to receive message status notifications intended for the originator.

8. The server of claim 7, wherein the processor is further programmed to cooperate with the communication port to
   identify to the originator the pre-defined plurality of recipients who are actively coupled to the wireless communication system when the group message is received by the server.

9. The server of claim 7, wherein the processor is further programmed to cooperate with the communication port to
   inform the originator when the group message has been transmitted to all of the pre-defined plurality of recipients.

10. The server of claim 7, wherein the processor is further programmed to cooperate with the communication port to:
    separate the pre-defined plurality of recipients into a plurality of predetermined categories; and
    inform the originator whenever the group message has been transmitted to all of the recipients in one of the plurality of predetermined categories.

11. The server of claim 7, wherein the processor is further programmed to cooperate with the communication port to
    identify to the originator one of the pre-defined plurality of recipients who is first to receive the group message.

12. The server of claim 7, wherein the processor is further programmed, when the predetermined condition is met, to cooperate with the communication port to
    send to the person designated the message status notifications intended for the originator.

13. The server of claim 12, wherein the predetermined condition is that the originator is no longer actively coupled to the wireless communication system.

14. The server of claim 12, wherein the predetermined condition is selected from a group of predetermined conditions consisting of a time of day range, a message priority level, and a pre-programmed preference.

15. A computer readable medium comprising software instructions that, when installed and executing on a processor that is coupled to a wireless communication system through a communication port, causes the processor to cooperate with the communication port to:
    receive, from an originator, a group message directed to an address associated with a pre-defined plurality of recipients whose coupling to the wireless communication system at any given time is one of active and inactive;
    store the group message,
    transmit the group message to each recipient of the pre-defined plurality of recipients whenever the recipient is actively coupled to the wireless communication system;

separate the pre-defined plurality of recipients into a plurality of predetermined categories; and inform the originator whenever the group message has been transmitted to all of the recipients in one of the plurality of predetermined categories unless a predetermined condition is met; and when the predetermined condition is met, to cooperate with the communication port to designate a person other than the originator to receive message status notifications intended for the originator.

16. The computer readable medium of claim 15, further causing the processor to cooperate with the communication port to identify to the originator the pre-defined plurality of recipients who are actively coupled to the wireless communication system when the group message is received.

17. The computer readable medium of claim 15, further causing the processor to cooperate with the communication port to inform the originator when the group message has been transmitted to all of the pre-defined plurality of recipients.

* * * * *